Sept. 13, 1938.　　　　B. W. ROBINS　　　　2,130,032
TESTING DEVICE
Filed April 17, 1935　　　　2 Sheets-Sheet 1

INVENTOR
BEN W. ROBINS
BY
ATTORNEY

Sept. 13, 1938.      B. W. ROBINS      2,130,032
TESTING DEVICE
Filed April 17, 1935      2 Sheets-Sheet 2

INVENTOR
BEN W. ROBINS
BY
ATTORNEY

Patented Sept. 13, 1938

2,130,032

UNITED STATES PATENT OFFICE 2,130,032

TESTING DEVICE

Ben W. Robins, Haddon Heights, N. J., assignor to Radio Corporation of America, a corporation of Delaware Application April 17, 1935, Serial No. 16,807

5 Claims. (Cl. 175—183)

This invention relates to testing devices and, in particular, to devices for testing the characteristics of electrical networks and visually indicating the results of such testing.

In the design of modern radio receivers, for example, where a plurality of tuned circuits are simultaneously controlled by a single adjusting means, it is imperative that each of the tuned circuits have substantially identical characteristics. In addition, if the receiver is of a well known super-heterodyne type wherein the intermediate frequency stages, through which the beat frequency currents pass, are of the fixed tuning type, it is necessary that these stages be tuned to the beat frequency and also that they shall have certain predetermined sensitivity and selectivity characteristics. In order that the above mentioned characteristics of the tuned circuits of the receiver can be fixed, it is customary to provide auxiliary tuning capacities which may be individually adjusted to give the required circuit performance. To readily determine the adjustments of these auxiliary capacities, which is necessary in large quantity production, it is desirable to have a visual means indicating the circuits' performance as one or more of the auxiliary tuning means are varied. This is desirable because the usual method of making a point-by-point test and subsequently plotting the resultant values is too slow and costly for rapid production.

It is, accordingly, an object of this invention to provide a device which will visually indicate the characteristic of the electrical network as a function of one of the variable parameters of the circuit.

Another object of this invention is to provide a device of the type described which will be essentially automatic in its operation.

Another object is to provide an oscillograph for aligning tuned circuits, as, for example, the intermediate frequency amplifier in a superheterodyne receiver, in such manner that the frequency response characteristic is precisely symmetrical about the predetermined frequency.

Another object of my invention is to provide simplified apparatus which may be either a cathode ray, an electrical magnetic oscillograph, or similar type device for aligning tuned circuits for the purposes above described.

Another object of my invention is to eliminate errors, when using oscillographs to align tuned circuits, that may be caused by distortion in a detector or audio-amplifier when used in conjunction with the oscillograph.

Another object of my invention is to eliminate errors of alignment which may be caused by the inherent frequency distortion of the galvanometer when used to test alignment of the circuits.

Another object of my invention is to avoid the necessity of reference marks for frequency calibration when using oscillographs.

Another object of my invention is to afford a two-dimensional response diagram of an electrically symmetrical network as one of its parameters is changed from a minimum value to a maximum value and back to its minimum value.

In the past, it has been customary to use a galvanometer to produce a visual image on a viewing screen to indicate the response of an electrical network. This was done in the following fashion:—a beam of light was focused on the mirror of a galvanometer and reflected to a moving mirror which has such a motion so as to impart a lateral motion to the beam reflected from the mirror. If, for example, the frequency response of the network was desired, a variable frequency oscillator whose frequency was varied essentially linearly and in synchronism with the moving mirror, was supplied. The output of the oscillator was coupled to the electrical circuit to be aligned and the output energy from the circuit detected and used to actuate the galvanometer element. As the galvanometer current changed in value, the light beam was raised or lowered in accordance with the changes of the current. Thus, a curve was traced on the screen with frequency as the abscissa and galvanometer current as the ordinate. The galvanometer current could be made proportional to the voltage appearing in the output of the circuit so that the circuit could be aligned for predetermined response at certain lateral points on the screen which represented predetermined frequencies. In the visual systems of the past, the sweep condenser made one-half a revolution from minimum to maximum capacity, while the light beam made one lateral sweep across the screen. Then the light beam was suppressed or intercepted so that it did not reach the screen for an equal duration of time while the sweep condenser rotated through another half-revolution to its original starting position.

The action was then repeated and at such a rate, that, due to the persistence of vision, a single curve was apparently visible on the screen. If a galvanometer was used which distorted the wave from the output of the circuit in any way due to its inability to follow the fast variations of current accurately, the curve seen on the screen was not a true response curve of the network under consideration. That is, if a true symmetrical circuit was being tested, but the galvanometer lag was greater than permissible, the curve traced on the screen would not be symmetrical and thus a false representation of the circuit's performance was obtained. To overcome this, the system, to be described more fully below, has twice the number of faces on the revolving mirror as was used in the past and projects a beam on the screen during the half-cycle in which the parameter (in this case, frequency) is going from maximum to minimum value as well as when the parameter goes from its minimum value to its maximum value. Thus two curves appear on the screen, one representing the curve as the parameter is increased, while the other represents the curve of the circuit as the parameter is being decreased. The repetition of this action occurs at such a rate that persistency of the vision gives apparently two traces on the screen.

If, for example, the frequency response of the circuit is desired, there is only one value of capacity of the sweep condenser which is obtained at two points exactly 180° out of phase as the condenser is rotated. Obviously, if the network is aligned to the frequency of the oscillator at this point, the peaks of the two curves will appear at the same point on the screen. If the network is symmetrically disposed about this point, the two curves normally obtained will coincide throughout their entire paths and will resolve into what is apparently only one curve.

Conversely, if the circuit is so aligned that only a single curve shows on the visual screen, it is certain that the response of the circuit is truly symmetrical. Any distortion introduced by the galvanometer which is present when sweeping through the frequency range in one direction is also present when sweeping through in the other direction and consequently, although distortion is still present, it has no detrimental effect in obtaining a truly symmetrical response.

The invention both as to its organization and method of operation together with additional objects and advantages thereof will best be understood from the following description of specific embodiments when read in connection with the accompanying drawings, wherein:—

Figure 1:
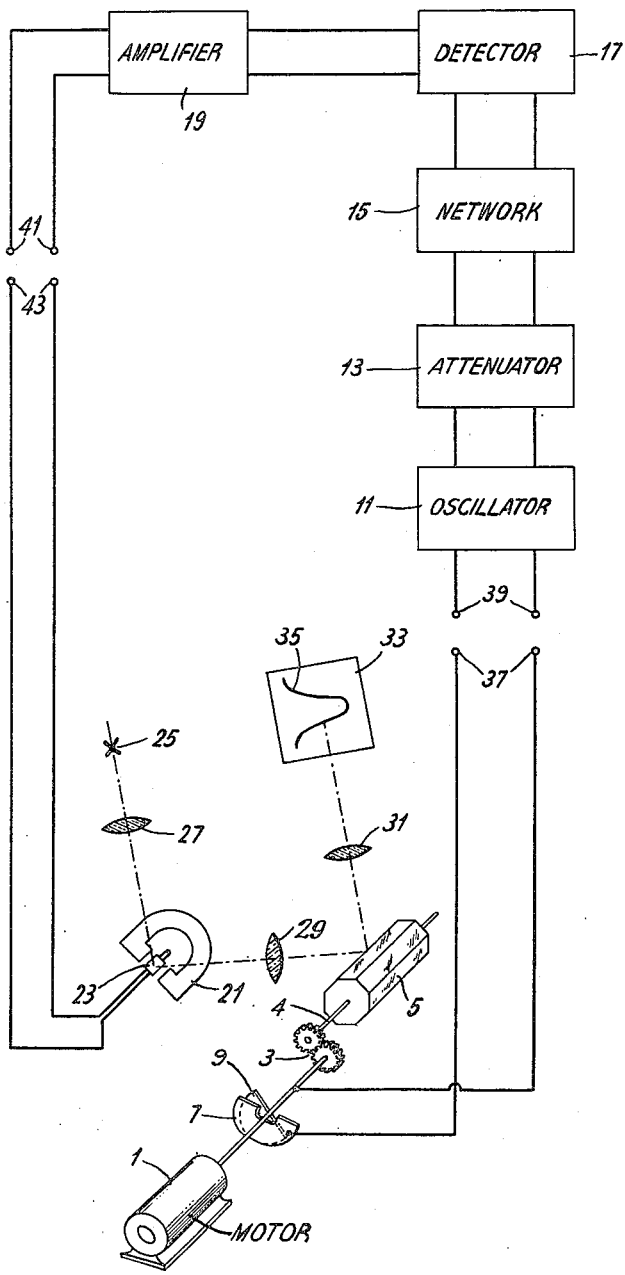
Fig. 1 shows a specific embodiment of the invention using a galvanometer and rotating mirror.

If reference is now made to the drawings and first to Fig. 1 thereof, a motor 1 is arranged to drive a shaft 4 through a reduction gear 3, and upon the shaft 4 a revolving mirror 5 is supported and a semi-circular rotating plate 9 is supported in the motor shaft so that it turns at a rate N/2 compared to the mirror speed, where N represents the number of mirror faces.

This rotating plate 9 acts in conjunction with a stationary semi-circular plate 7. These two plates 7 and 9 together constitute an auxiliary capacity which is placed across the tuning capacity of a radio frequency oscillator 11 by connecting terminals 37 which lead to the stator and rotor plates 7 and 9 to terminals 39. This oscillator 11 may be of any conventional type such as the well known Hartley, Colpitts and others, for example. The revolving mirror 5 has a plurality of faces, the number of which is equal to twice the gear reduction ratio of the gear train 3. The output of the oscillator 11 is coupled to the network 15 under investigation through a variable attenuator 13, such for example as the type known in the art as the "ladder" type or the "H" type or "T" type. The purpose of this attenuator is simply to adjust the level of volume of the oscillator 11 output. The output of the network 15 is connected to a detector 17 and the output of the detector is connected to an audio-amplifier 19. The output of the amplifier 19 is connected to a galvanometer 21 by connecting terminals 41 to 43. This galvanometer comprises a bi-filar winding upon which is mounted a small plane mirror 23. A light source 25 which may, for example, be an arc light or an incandescent point-source, is focused on the mirror 23 by means of a lens 27. The reflected light from the mirror 23 is then focused on the revolving mirror by lens 29. The reflected light from the revolving mirror 5 is then focused on the convex translucent viewing screen 33 by lens 31. It is, of course, understood that the lenses 27, 29 and 31 may be a more complex optical train than just a simple lens. The operation then is as follows:

As the condenser plate 9 rotates with respect to the fixed plate 7, the frequency of the oscillator 11 begins to increase. If the network 15 is, for example, a tuned band-pass transformer, as the frequency increases the output response of the network will also increase. This increase will continue until the lower cut-off frequency point is reached when the output will remain essentially constant as the frequency continues to increase, and then still further increase will cause a decrease in the output. This variation in output actuates the galvanometer mirror 23 so as to produce a lateral displacement proportional to the output current. Simultaneously with this, however, the rotating mirror is producing a vertical displacement so that the beam of light under these combined displacements will trace the curve 35 on the screen 33. This, of course, occurs during the first half of a revolution of the condenser plate 9. As the shaft 4 continues to revolve the plate 9 moves in such a direction to increase the value of capacity across the tuning capacity of the oscillator 11. This is accompanied by a decrease in the frequency and the network response begins to increase up to the upper cut-off point where it remains constant as the frequency continues to decrease to the lower cut-off point, whereupon the output then falls off. This produces at the galvanometer a deflection which is proportional to the response of the network. However, due to the fact that simultaneously with the increase in capacity, another face of the rotating mirror 5 comes into action the vertical displacement of the beam of light on the screen 33 begins again from its initial point.

It is apparent that the double sweeping arrangement across the screen 33 can be divided into two groups. The odd sweeps, 1, 3, 5 . . . indicating the response of the tuned circuit for increasing frequencies, while the alternate or even sweeps 2, 4, 6 . . . give a trace indicative of the output of the circuit when the frequency is changing from its maximum to minimum value. To further clarify the description of what this invention attains, reference to Fig. 4 should be made.

Figure 4:
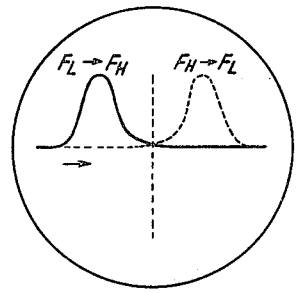
Fig. 4 shows the image appearance for an unsymmetrically tuned circuit.
Figure 5:
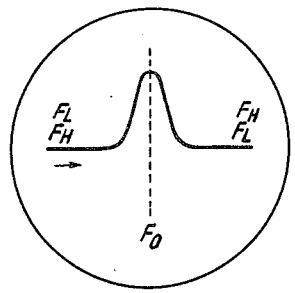
Fig. 5 shows the image appearance for a symmetrically tuned circuit.

In Fig. 4 the solid line curve shows, for example, the trace as might be obtained from a mis-tuned circuit when the frequency is the variable parameter and in this case the frequency is varied from its minimum to its maximum value. The dotted line shows the trace for the same circuit response, except that in this case the frequency is going from its maximum to minimum value. The direction of the abscissa motion is the same for both cases and this is indicated by the arrow in Fig. 4. In each instance $F_L$ represents the lower frequency and $F_H$ the higher frequency. In this curve also $f_0$ indicates the predetermined frequency for which it is desired to tune the circuit. Since the two traces $F_L$—$F_H$ and $F_H$—$F_L$ are displaced from one another, it is evident that the circuit 15 is incorrectly tuned. When the circuit 15 under investigation is correctly tuned, a trace shown in Fig. 5 results. In this case both of the curves for increasing and for decreasing variations of the parameter (frequency) coincide so that there results a single visual trace. Such an indication at once indicates to the operator making the adjustments upon the circuit 15 under investigation that the adjustments are now correct. Thus by making use of what hitherto was considered a detrimental feature, i. e. the trace on the screen during the time that the frequency was being returned to its initial value, a result is obtained which is far more satisfactory than the older methods of testing with oscillographs.

Figure 2:
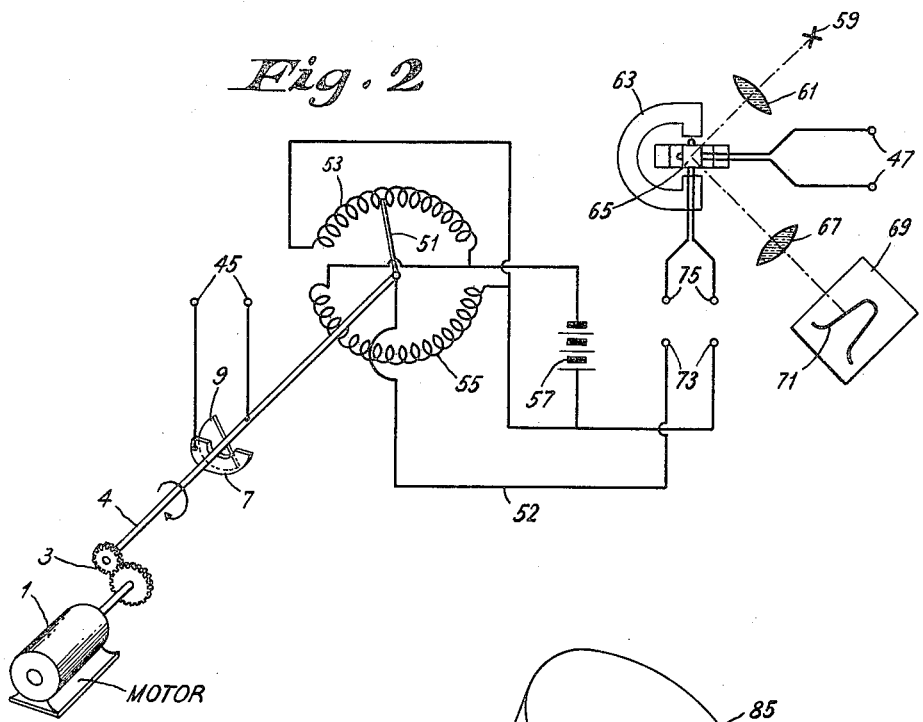
Fig. 2 shows a modification of the invention using a two dimensional galvanometer.

It is not necessary, however, to use a single oscillograph unit in conjunction with a rotating mirror to achieve these results. The same effect can be obtained by using a two-dimensional oscillograph. In this case the network response is placed on one of the bi-filar strings of this oscillograph while a current which has a saw-tooth wave form is placed on the other bi-filar string. Since the motion of the mirror is determined by two forces acting at right angles to one another, it is clear that the saw-tooth wave form will produce a linear lateral motion of the beam of light, while the current response of the network will produce a vertical deflection. The combination of these two displacements acting simultaneously will result in exactly the same kind of a trace as was developed by the means used above. The organization of the apparatus using this embodiment of the invention is shown in Fig. 2. Referring to this figure a motor 1 drives shaft 4 through a reduction gear 3 and this shaft supports a rotating semi-circular plate 9 which acts in conjunction with a stationary semi-circular plate 7. The shaft 4 likewise supports a rotating arm 51 which makes contact with a circular form holding two resistance windings 53 and 55. These windings are separated from one another at both ends by a distance slightly greater than the width of the rotating arm 51. The opposite ends of the windings are connected together and in turn are connected to a battery 57. A lead 52 is connected to the rotating arm 51. This lead 52 and one side of the battery 57 are connected to one of the bi-filar strings through the connections of terminals 73 to 75 of the two-dimensional galvanometer 63. Thus, as the arm 51 rotates increasing current will flow through the bi-filar winding of the galvanometer 63 and there will result a displacement of mirror 65 proportional to this flow of current.

At the end of one-half of revolution, the rotating arm 51 is disengaged from the winding 53 so that the current drops to zero and further rotation of the arm 51 starts current flowing again through the bi-filar strings so that for each complete revolution the current has built up from a minimum to a maximum twice, resulting in two lateral deflections of the mirror 65. The terminals 47 are connected to the output of the amplifier 19 of Fig. 1 through the terminals 41 of Fig. 1 so that the vertical deflections of the mirror 65 are controlled by the response of the network 15. The terminals 45 serve to connect the auxiliary varying condenser comprising plates 7 and 9 to the oscillator 11 of Fig. 1 through the terminals 39, also of Fig. 1. It is believed that it is unnecessary to include in Fig. 2 the block diagram indicating the oscillator, attenuator, network, detector, and amplifier shown in Fig. 1, since these are identical in both cases and the main consideration is the embodiment of the modification showing the use of a two-dimensional galvanometer.

A further modification can be made by using a cathode ray oscilloscope. In this case there is applied to one pair of deflecting terminals, a linear sweep voltage which may be generated, for example, in the same fashion as shown in Fig. 2 or which may be generated by a thermionic saw-tooth wave generator as is well known in the art and disclosed for example by Knoop Patent 1,613,954. The other pair of beam deflecting plates which are perpendicular to the first set has impressed on it a voltage proportional to the electrical response of the electrical network of which the characteristics are being investigated. The trace appearing on the fluorescent screen of the cathode ray tube will then be laterally displaced by the sweep voltage, while the vertical displacement will depend on the electrical response of the network. Since both of these deflections occur simultaneously, a trace will appear on the end of the tube which will have the same characteristics as those outlined in the above description of the operation of the embodiments shown in Figures 1 and 2.

Figure 3:
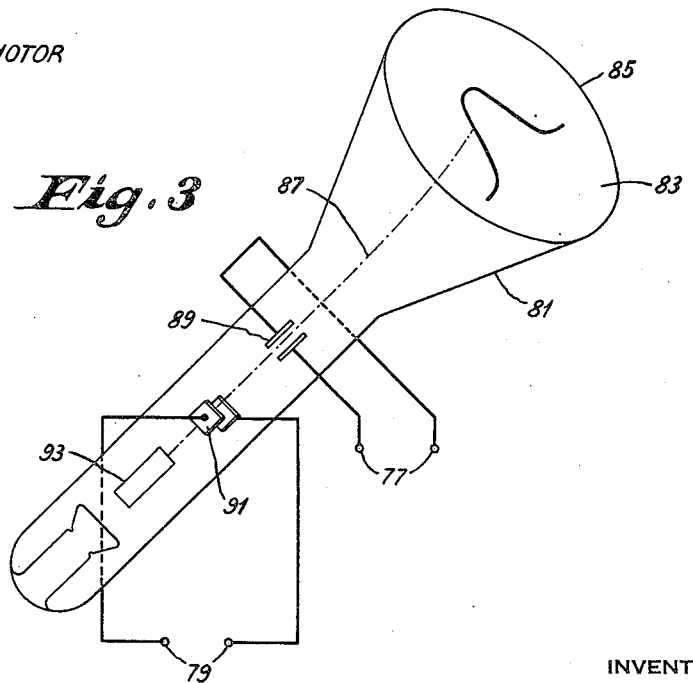
Fig. 3 shows another modification using a cathode ray tube.

Referring to Fig. 3, numeral 81 represents a conventional cathode ray tube. In this tube 81 is placed the usual electron beam-gun 93 which comprises a source of electrons and means for focusing the electron stream produced into a sharply defined beam 87 and directing this beam onto a luminescent screen 83. The electron beam in its passage toward the screen 83 passes between two pairs of deflecting electrodes or plates 89 and 91 which are disposed perpendicular to each other. A pair of leads 79 which are connected with the plates 91 has connected to it the saw-tooth wave generator which may be of the form as shown in Fig. 2 in which case the terminals 73 would be connected to 79. The other pair of plates 89 connect by means of connecting terminals 77 of Fig. 3 to the terminals 41 of Fig. 1 to the output of the amplifier 19 through which the currents responsive to the network 15 are amplified.

From the foregoing description it will be apparent that the last described modification provides a convenient purely electrical means for obtaining a visual indication of a network response for both increasing variation and decreasing variation of a circuit parameter, and it will also be apparent that this indication has such a repetition rate that an apparent single image is produced because of the persistency of vision of the eyes of the observer.

While an electrostatic electron beam deflection system has been described it, of course, will be obvious that electromagnetic or a combination of electrostatic and electromagnetic deflection systems may be used with equally as efficient results as is well known in the art.

It is, of course, apparent that while the description of the method of accomplishing the results have been confined to frequency variation, the variable network parameter might easily be, for example, a variable inductance. In this case a constant frequency would be fed to the network and the variable inductance mounted on the motor shaft so that its value would be changed from minimum to maximum inductance and back from maximum to minimum inductance in synchronism with the mirror in the case of Fig. 1, or the rotating arm 51 in the case of Figs. 2 and 3. Or again, it may be desired to have the network response as a capacity or resistance or combination of any of the parameters varied. It is believed that those skilled in the art will readily appreciate the organization of the apparatus for accomplishing these or any other circuit parameter variations where a rapid visual response is required.

This system might well be called a "double image" system and has the advantage over the conventional "single image" system in that the superposition or folding back of the high and low values of the parameter traces make symmetrical adjustments extremely easy and accurate. A further advantage is that the probability of error in aligning circuits is reduced to less than one-half of that for the single image method since for a given frequency error the separation between the two curves of the double image method is twice the displacement of the single curve of the presently known conventional method. It is also obvious that any small error is much more easily detectable with the two images since the eye of the observer is an excellent comparison medium. In other words, the eye is far more efficient in comparing two similar structures than it is in determining the absolute value of a single one. The use of this method has another important advantage in that the use of an electrical or mechanical shutter, necessary in the older conventional methods, is eliminated.

Another very desirable feature of the double image method is that distortion in the detector or audio-amplifier will not cause error in aligning the circuit. If appreciable audio-distortion is present, the images on the screen will not be true response curves of the network. Nevertheless, the actual response is still truly symmetrical when the two curves are made to coincide completely. A marked advantage which appears from using this method, and results from the fact that there is but one point at which the two frequencies coincide, is that a vertical reference line on the screen is unnecessary for alignment, that is, when the two images coincide in the double image method, they must be symmetrical about the desired frequency point. In the older conventional methods where only a single image was formed on the screen, it was necessary to place a vertical reference mark on the observation screen in order to determine whether the response of the network was actually symmetrical about the desired frequency.

Another advantage which accrues to this method of testing apparatus is that frequency calibration of the variable frequency oscillator by zero-beating with a standard frequency oscillator can be performed without regard to the displacement of the curve by audio distortion.

Many modifications and changes may be made in the circuits hereinabove described without departing from the spirit and scope of the present invention and it is to be understood that such modifications as would suggest themselves to those skilled in the art may be made and used insofar as they fall fairly within the scope of the hereinafter appended claims.

Having now described the invention what is claimed and desired to be secured by Letters Patent is the following:—

1. A measuring device comprising means for deriving a current in response to an alternating potential, means for causing the frequency of said alternating potential to change periodically through a recurrent cycle, a rotating polygonal mirror, and means for causing a light beam to move longitudinally of the faces of said mirror during its rotation, the speed of rotation of said mirror and the periodic change in the frequency of said oscillating potential being so correlated that a complete cycle of each change occurs during the time the mirror has made N/2 revolutions where N is the number of faces of the mirror.

2. In a testing system wherein is provided an electrical network to be tested and a means for periodically varying one of the parameters of the network, the method of visually indicating the response of the network comprising the steps of directing a beam of energy onto a viewing member, deflecting the beam between two predetermined values each time the sign of the derivative of the variation of the parameter changes, and simultaneously deflecting the beam at right angles to the first deflection in proportion to the response of the network.

3. In a testing system the combination of an electrical network, means for generating an alternating current, means for periodically varying the frequency of said alternating current, means for supplying the generated current to the network, means for deriving a current proportional to the response of the network, a galvanometer having a mirror element forming a part thereof, means for actuating the galvanometer by said derived current, a source of light, means for directing said light onto the mirror of the galvanometer, a polygonal mirror surface adapted to rotate in synchronism with the means for varying the frequency of the alternating current, means for directing the reflected light from said galvanometer mirror onto the polygonal mirror, and means to direct the reflected light from the polygonal mirror onto a viewing screen twice for each complete cycle of the variation of frequency of the alternating current.

4. In a testing system the combination of an electrical network, means for generating an alternating current, means for periodically varying the frequency of said generated alternating current, means for supplying current to the network, means for deriving a current proportional to the response of the network, means for deriving a potential proportional to the absolute variations of the frequency of said alternating current, a cathode ray tube, means for deflecting the electron beam developed within the tube vertically by the said derived current, means for deflecting simultaneously the said beam horizontally by said derived potential, and means for causing the resultant path of said deflected beam to become visible.

5. In a testing system the combination of an electrical network, means for generating an alternating current, means for periodically varying the frequency of said alternating current, means for supplying current to the network, means for deriving a current proportional to the response of the network, means for deriving a current proportional to the absolute variations of the frequency of said alternating current, a two dimensional galvanometer bearing a mirror actuated simultaneously by both of said derived currents, a source of light, means for directing said light onto the mirror of the galvanometer, and means for directing the reflected light from said mirror into a viewing screen.

BEN W. ROBINS.